United States Patent [19]

Wise et al.

[11] 4,313,641

[45] Feb. 2, 1982

[54] SELECTIVELY OPERABLE CONTROL SYSTEM FOR VEHICLE BRAKE VALVE

[75] Inventors: Stanley S. Wise, Palm Beach; Gregory Csurgay, Fort Lauderdale, both of Fla.

[73] Assignee: Fail Safe Industries, Inc., Lantana, Fla.

[21] Appl. No.: 90,760

[22] Filed: Nov. 2, 1979

[51] Int. Cl.$^3$ .............................................. B60T 13/68
[52] U.S. Cl. ............................................ 303/3; 303/89
[58] Field of Search ................. 188/3 R; 303/3, 7, 15, 303/89

[56] References Cited

U.S. PATENT DOCUMENTS

| | | | |
|---|---|---|---|
| 2,585,711 | 2/1952 | Whitney et al. | 303/89 X |
| 2,670,063 | 2/1954 | Reynolds | 303/89 X |
| 3,515,442 | 6/1970 | Whittemore | 303/89 |
| 3,528,707 | 9/1970 | Casey | 303/3 X |
| 3,735,834 | 5/1973 | St. Onge | 303/89 X |
| 3,770,324 | 11/1973 | Stevenson et al. | 303/89 X |

Primary Examiner—Duane A. Reger
Attorney, Agent, or Firm—Oltman and Flynn

[57] ABSTRACT

This invention relates to a selectively operable control system for use on an automotive vehicle to insure that the brakes of the vehicle will be locked after the engine has been turned off so as to prevent the vehicle from being stolen. The system includes a valve with a bidirectional motor and a control circuit for bidirectionally energizing the motor. The valve is established in an open position for normal braking only when an electronic key is inserted in a receptacle, and in a closed anti-theft position having check valve characteristics when the key is not inserted.

5 Claims, 8 Drawing Figures

SELECTIVELY OPERABLE CONTROL SYSTEM FOR VEHICLE BRAKE VALVE

SUMMARY OF THE INVENTION

This invention relates to a selectively operable control system for use on an automotive vehicle in conjunction with a valve in the vehicle's hydraulic brake system to control certain aspects of the braking operation. The present invention insures that the brakes will be locked after the engine has been turned off, so as to prevent the vehicle from being stolen. The invention is related to inventions disclosed and claimed in U.S. patent application of Gregory Csurgay, Ser. No. 6/090,757 filed Nov. 2, 1979, entitled High Pressure, Multi-Function, Sealed Valve, and U.S. patent application of Gregory Csurgay and Willes W. Reeder, Ser. No. 6/090,759 filed Nov. 2, 1979, entitled Control System For Vehicle Brake Valve, both assigned to the same assignee as the present invention.

A principal object of this invention is to provide a novel and improved control system for the hydraulic brake system of an automotive vehicle.

Another object of this invention is to provide such a control system having a novel provision for establishing an "anti-theft" mode in the hydraulic brake system under appropriate circumstances.

Another object of this invention is to utilize features of the inventions disclosed and claimed in the aforementioned United States patent applications together with features particularly adapted to providing an "anti-theft" system.

Further objects and advantages of this invention will be apparent from the following detailed description of a presently-preferred embodiment thereof, which is shown in the accompanying drawings.

Before explaining the disclosed embodiment of the present invention in detail, it is to be understood that the invention is not limited in its application to the details of the particular arrangement shown since the invention is capable of other embodiments. Also the terminology used herein is for the purpose of description and not of limitation.

HYDRAULIC BRAKE SYSTEM

Figure 3:
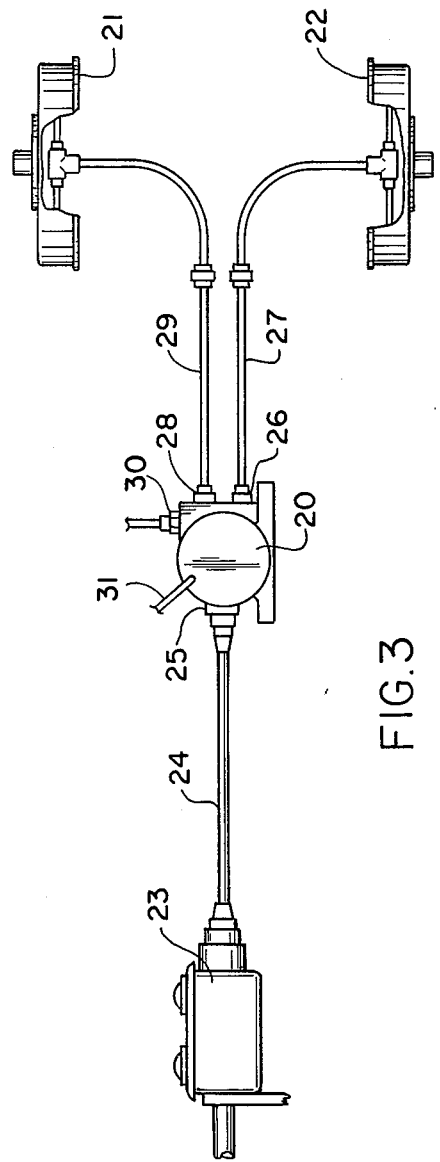
FIG. 3 shows schematically the hydraulic brake system on a vehicle having a brake valve whose operation is controlled by the present selectively operable control system.

The present control system may be used with a brake system on an automotive vehicle, as shown in FIG. 3. As described in detail with reference to FIGS. 4–8, the brake system includes a valve 20 controlled by an electric motor to provide:

(1) normal braking operation; or
(2) anti-theft operation.

The brake system and its control valve are disclosed in the aforementioned U.S. patent application of Gregory Csurgay. A control system capable of providing normal braking operation, or anti-theft operation, or a combination thereof is disclosed in the aforementioned U.S. patent application of Gregory Csurgay and Willes W. Reeder.

Referring to FIG. 3, the brake system has a left front brake 21 and a right front brake 22. The master cylinder 23 of the brake system is connected through a hydraulic line 24 to the inlet port 25 of valve 20. A first outlet connection 26 of the valve 20 is connected by a line 27 to the right front brake 22. A second outlet connection 28 of the valve 20 is connected by a line 29 to the left front brake 21. A third outlet connection 30 for the valve 20 is connected to a pressure switch (not shown). Lead wires 31 are provided for making electrical connections to the valve, and the openings in the valve from which these wires extend are sealed.

Figure 4:
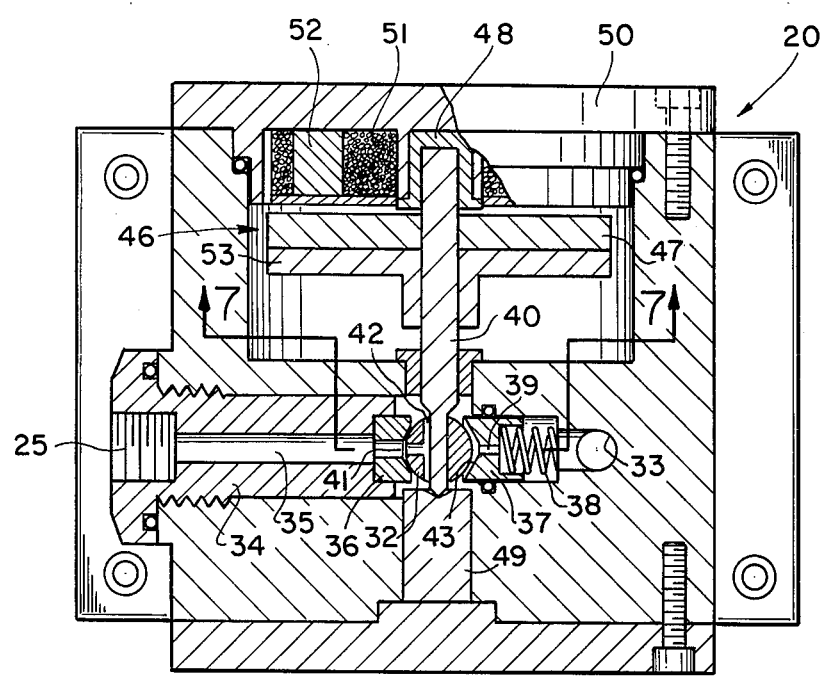
FIG. 4 is a longitudinal sectional view taken horizontally through the brake valve in the FIG. 3 brake system.
Figure 6:
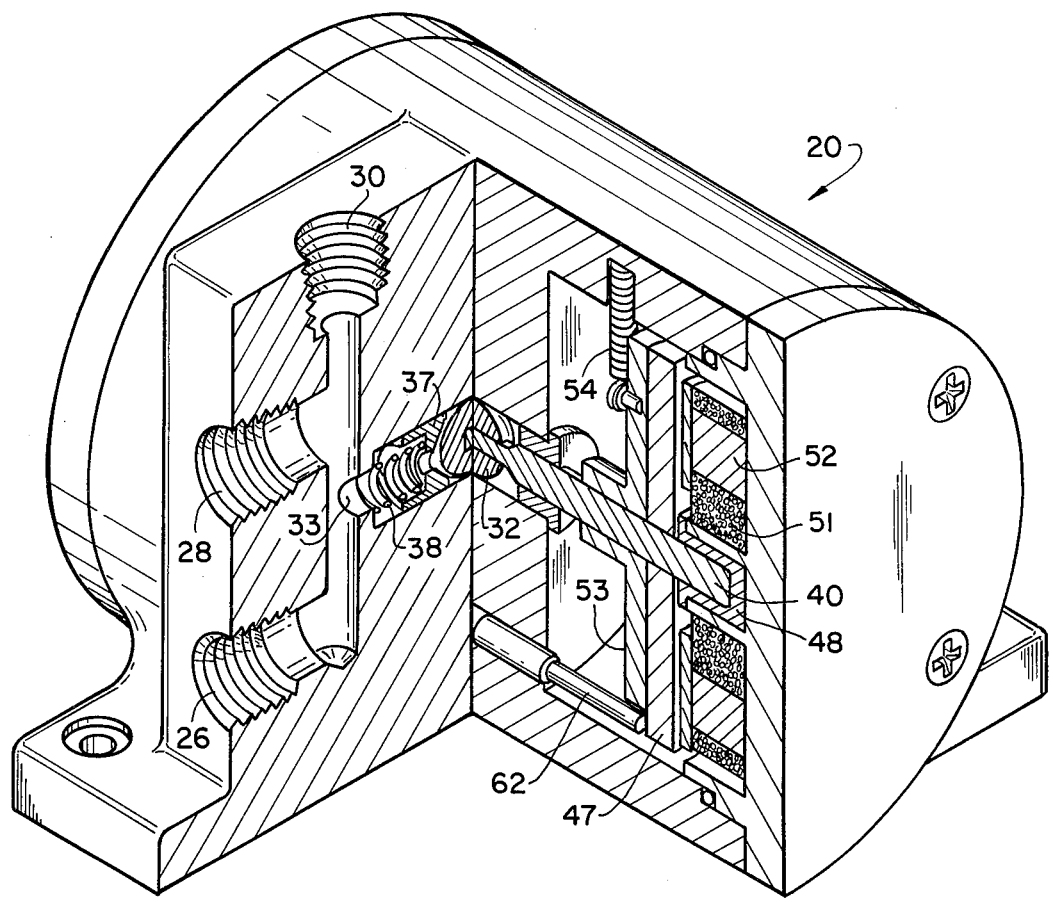
FIG. 6 is a perspective view of this brake valve broken away along longitudinal and cross-sectional planes to reveal details of the valve's construction.

Referring to FIG. 4, the valve 20 includes a ball valve member 32 located between the inlet port 25 and an outlet port 33. As shown in FIG. 6, the outlet port 33 is connected to each of the outlet connections 26, 28 and 30 of the valve. In FIG. 4, the valve has a plug 34 with an axial passageway 35 which communicates from the inlet port 25 through a fixed valve seat 36 with the ball valve member 32. On the other side of the ball 32, there is a movable valve seat 37 which is biased against the ball valve member 32 by a spring 38. The outlet port 33 communicates through an opening 39 leading through the movable valve seat 37 with the ball valve member 32.

The ball valve member 32 has a passage 41 which leads from the exterior of the ball to the hollow interior 42 of the ball. When the passage 41 registers with the opening 35, hydraulic fluid can flow through the passage 41 into the hollow interior 42 of the ball. From there, the fluid can escape around the shaft 40 into the hollow interior of the valve such that the interior of the valve is wet with hydraulic fluid.

Figure 7:
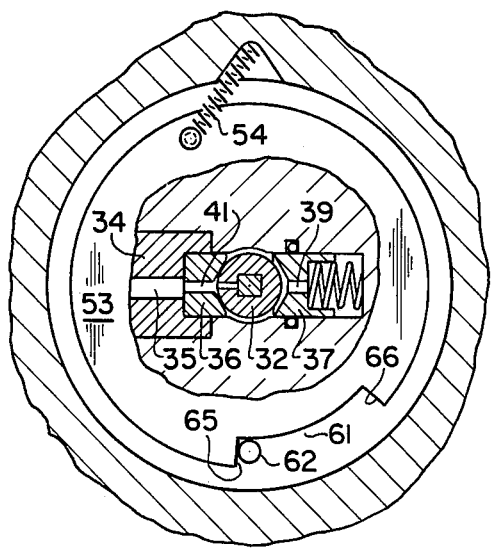
FIG. 7 is a cross-sectional view taken along the lines 7—7 in FIG. 4, showing the ball valve member in its "normal braking" position.

The movable valve seat 37 has a groove 43 in its face (FIG. 5) such that the hydraulic fluid can flow from the interior of the valve through the groove 43 to the outlet opening 39. Thus, when the passage 41 registers with the opening 35 as shown in FIG. 7, the valve is open, and fluid can flow between the inlet port 25 and the outlet port 33. When the ball 32 is in the closed position shown in FIGS. 5 and 8, the blocking portion 44 of the ball 32 registers with the opening 35. The tangent point of the ball is separated from the horizontal axis of the ball, and the passage 41 is beyond the tangent point, so the blocking surface 44 closes the valve.

Figure 5:
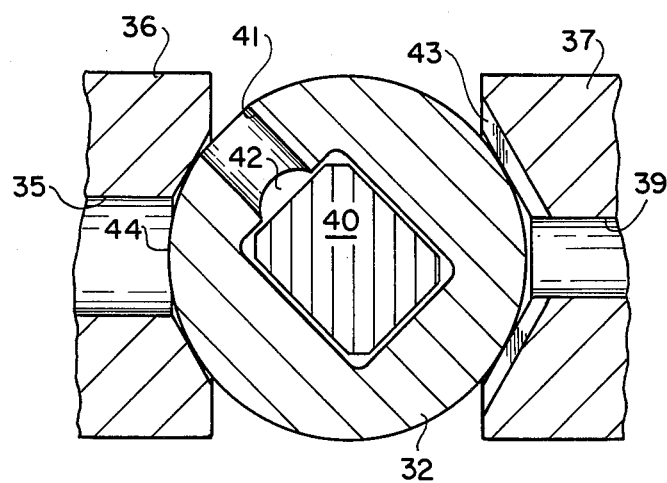
FIG. 5 is an enlarged cross-sectional view of the ball valve member in this brake valve.

When the valve is in the closed position as shown in FIG. 5, an increase of the pressure in the inlet opening 35 will force the ball 32 away from the fixed valve seat 36 so that hydraulic fluid will flow through the outlet groove 43 and the outlet opening 39.

When the valve is in the open position (the passage 41 registering with opening 35) the brakes of the vehicle illustrated in FIG. 3 may be applied by the brake pedal in the noraml braking action.

When the passage 41 is in the position shown in FIG. 5, the valve is closed, and the valve performs a unidirectional check valve function such that when the brake pedal is depressed, the brakes will be applied, and any increasing pressure on the brake pedal will also be applied to the brakes. The pressure is trapped in the brake lines 27 and 29 so the brakes will remain applied. This function of the valve will be referred to as an anti-theft function, since the vehicle cannot be moved as long as the pressure is locked in the brake cylinders.

The hollow interior 42 inside the ball 32 is slightly larger than the shaft 40 and this gives the ball freedom to move away from the fixed valve seat 36 in the manner described.

The valve 20 includes a positioning device in the form of a motor and stops. The motor 46 (FIG. 4) include a face-to-face polarized magnet 47 mounted on the shaft 40. The shaft 40 is journaled for rotation in bearings 48 and 49. Inside an end cap 50 on the valve an electrical coil 51 is wound about an annular core 52. Behind the magnet 47 a stop disc 53 of magnetic material is mounted on the shaft 40 for rotation. The disc 53 provides a return flux path for flux from the coil 51, and the end cap 50 also provides a return flux path. The disc 53 also serves as a stop as will be explained further.

Figure 8:
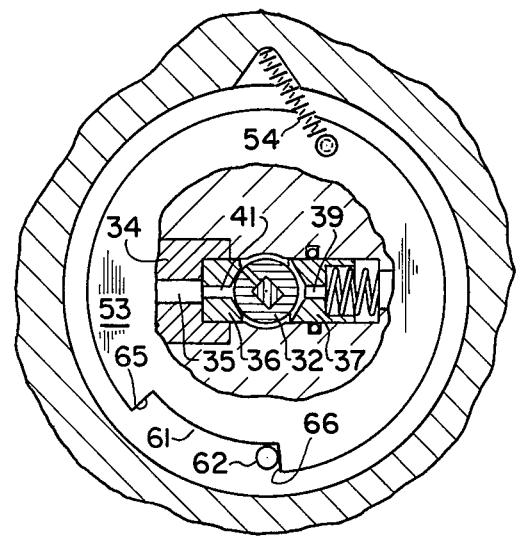
FIG. 8 is a view similar to FIG. 7 showing the ball valve member in its "anti-theft" position.

When the coil 51 is energized with direct current, the flux exerts a force on the magnet 47 which causes the magnet, the stop disc 53 and the shaft to rotate. The direction of rotation depends upon the polarity of the energizing direct current. The rotation of the shaft 40 also rotates ball valve member 32. A spring 54 is mounted between the disc 53 and the housing of the valve as shown in FIGS. 7 and 8. One end of the spring 54 is affixed to the stop disc 53 and the other end is affixed to the housing. Thus the spring 54 provides an over-center spring action for biasing the stop disc to either the open position of the valve or the closed anti-theft position.

The stop disc 53 has a circumferentially extending cut-out section 61 in its periphery (FIGS. 7 and 8) and the end shoulders of these cut-out sections serve as stop surfaces for the disc 53. Mounted in the housing there is also a fixed stop pin 62 (FIG. 6) which also cooperates with the stop disc 53.

When the valve is in the open position (passage 41 registering with opening 35 as viewed in FIG. 7) the fixed stop pin 62 abuts against the stop shoulder 65 at one end of the cutout section 61 on the stop disc. In this position, the spring 54 is urging the stop disc 53 in the counter-clockwise direction.

When the valve is in the closed anti-theft position (passage 41 not registering with opening 35 as in FIG. 8) the fixed stop pin 62 engages the stop shoulder 66 to hold the valve in the closed anti-theft position. The spring 54 is urging the stop disc 53 in the clockwise direction as viewed in FIG. 8.

As explained hereinafter, the electronic control for this braking system includes a electronic key which must be inserted in a switch receptacle in order to activate the circuitry. When the key is in position, power of the proper polarity is supplied to the motor winding 51, and the motor is energized to rotate the stop disc 53 and the ball valve 32 to the position shown in FIG. 7. This is the open position. When the key is not in position in the electronic control system or the wires of the electronic control system are cut, power is supplied to the motor winding 51 in a reverse polarity. The motor rotates the stop disc 53 and the ball valve member 32 clockwise to the position shown in FIG. 8. This is the anti-theft position. The stop disc is held in the anti-theft position by the engagement of the fixed stop pin 62 against the stop shoulder 66 at the opposite end of the cut-out 61 in the stop disc.

Thus, the valve of FIGS. 4–8 is a two position valve. The valve is totally sealed, and only electrical connections emerge from the valve. The ball valve member is positioned by an internal positioning device including a motor and stops, as described.

CONTROL SYSTEM

Figure 1:
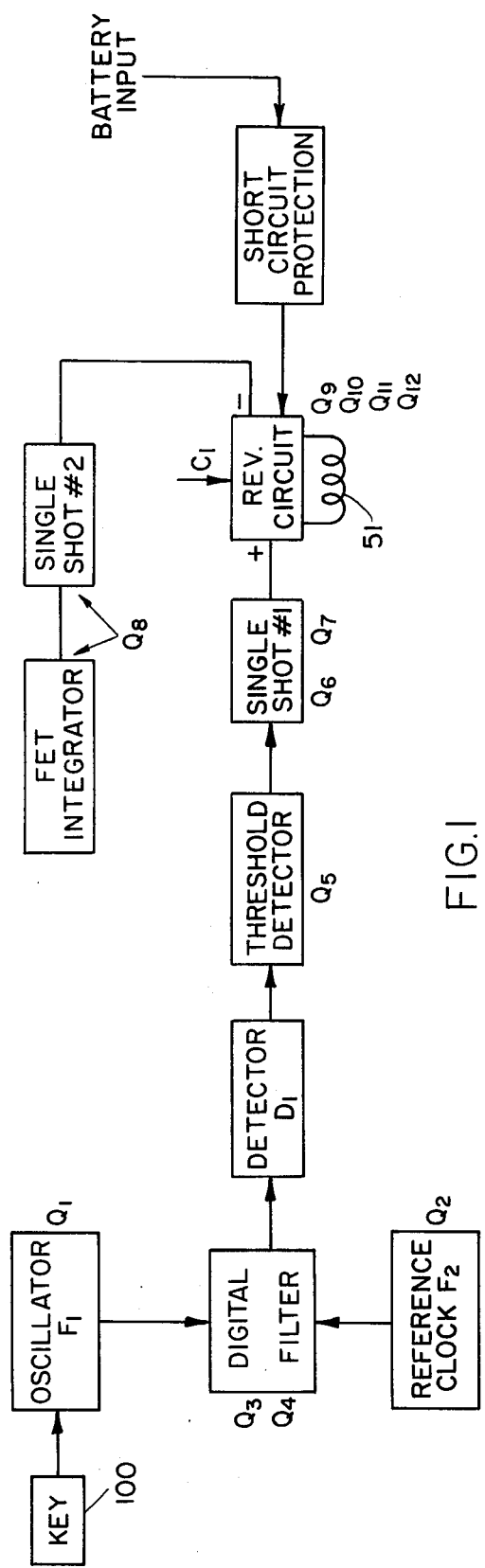
FIG. 1 is a schematic block diagram of the present selectively operable control system.
Figure 2:
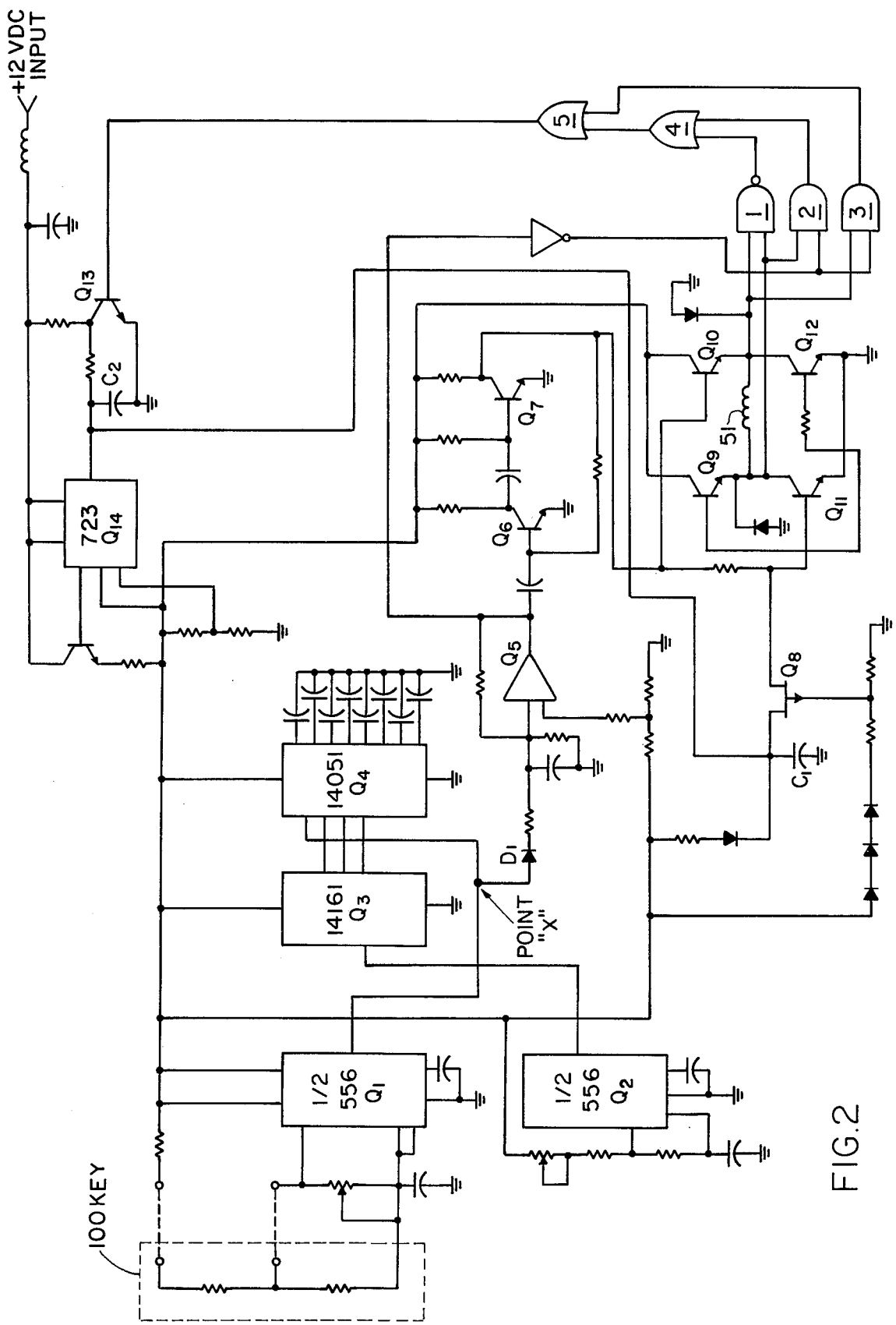
FIG. 2 is a more detailed circuit diagram of this control system.

The electronic control system for the valve 20 is shown in block diagram form in FIG. 1 and in more detail in FIG. 2. The anti-theft coding consists of two free running oscillators $Q_1$ and $Q_2$. The frequencies they generate depend on their "outside" circuitry, namely resistors and capacitors. Oscillator $Q_2$ generates a particular, definite frequency. Oscillator $Q_1$ also generates a particular frequency, and this frequency will only equal the frequency generated by oscillator $Q_2$ if the proper resistive or resistive and capacitive outside network is provided. This outside network is the electronic key 100. When the key 100 is inserted into the switch receptacle which connects to the control points of the oscillator $Q_1$, oscillator $Q_1$ will generate the same frequency as oscillator $Q_2$ within certain acceptable tolerances.

$Q_3$ and $Q_4$ are a digital filter which cooperate with the oscillators $Q_1$ and $Q_2$.

When the two frequencies are the same within certain tolerances, point x will receive a positive going voltage. Only if the frequencies of oscillators $Q_1$ and $Q_2$ are substantially equal, will point x receive a positive going output (increasing amplitude A.C. signal).

Detector $D_1$ converts this positive going alternating voltage to a D.C. voltage for the threshhold detector $Q_5$. At this instant, if there is no battery power provided from the ignition key, nothing will happen. If battery voltage is provided by turning on the ignition key, then threshhold detector $Q_5$ will trigger a single shot circuit which is made up of transistors $Q_6$ and $Q_7$ into conduction. This action will turn on transistors $Q_9$ and $Q_{12}$ of the reversing circuit for a duration long enough to energize the coil 51 of the valve in a polarity to rotate the valve to its open position shown in FIG. 7. This position allows free flow of hydraulic fluid to and from the brake cylinders.

If the electronic key 100 is missing, and the car is started by the ignition key or otherwise, the valve will stay closed in the position shown in FIG. 8. Pressure on the brakes will cause the brakes to be locked. The valve is in the closed anti-theft position after the vehicle stops. The same thing will happen if the wrong key is inserted.

Once the valve has been rotated to the open position of FIG. 7, if the car is then stopped by turning off the ignition, or if the electronic key 100 is removed from its receptacle, or if the wiring of the whole system is cut, field effect transistor $Q_8$ will sense a decaying voltage and will turn transistors $Q_{10}$ and $Q_{11}$ on. This will dump the existing charge from capacitor $C_1$ into coil 51 in an opposite polarity which will rotate the valve to its closed anti-theft position shown in FIG. 8. Since this is the position of the valve to provide uni-directional check valve action, any brake pressure applied will now be trapped in the brake cylinders preventing movement of the vehicle. Thus, the valve is in the closed anti-theft position after the vehicle stops. Releasing of the brakes can only be accomplished by inserting the proper electronic key 100.

"AND" gates #1, #2 and #3 sense the conditions at the output of threshhold detector $Q_5$, and at the terminals of coil 51. If the transistors in the reversing circuit ($Q_9$, $Q_{11}$, $Q_{10}$, $Q_{12}$) should short, the "OR" gates 4 and 5 will send a command to $Q_{14}$ via transistor $Q_{13}$ to turn B+ power off. When the power is turned off, field effect transistor $Q_8$ will discharge capacitor $C_1$ into coil 51 and change the valve from "open" to the closed anti-theft position. This is prohibitive when shorting happens during driving. To eliminate this condition, capacitor $C_2$ is connected to capacitor $C_1$ and when a shut-down command arrives to transistor $Q_{13}$, the charge on capacitor $C_1$ is dumped to ground quickly enough to prevent coil 51 from receiving enough energy to turn the valve to the closed anti-theft position.

We claim:

1. In an automotive vehicle brake system having hydraulic brake means, and valve means operatively connected to control the hydraulic pressure in said brake means, said valve means having an open first position in which it is operable either to relieve said hydraulic pressure or to apply a pressure increase to said brake means, said valve means having at least one additional position in which it acts as a one-way check valve operable to apply a pressure increase to said brake means but not to relieve pressure in said brake means, the improvement which comprises:

a bidirectional electrically energizable means for controlling the position of said valve means;

and a control circuit means operatively connected to said bidirectional electrically energizable means and operable to energize the same bidirectionally to affect the positioning of said valve means in said open position when the vehicle is moving and in said additional position after the vehicle stops;

said control circuit means including;

a selectively operable device;

and a means for energizing said bidirectional electrically energizable means with current of one polarity to position said valve means in said additional position when said selectively operable device is not operated and for energizing said bidirectional electrically energizable means with current of the opposite polarity to position said valve means in said open position when said selectively operable device is operated;

said selectively operable device including a key operated switch and a key insertable to operate said switch;

said bidirectional electrically energizable means comprising an electric motor operable when energized with current of one polarity to urge said valve means to said additional position and operable when energized with current of the opposite polarity to urge said valve means to said open position;

said valve means including an overcentering spring for biasing said valve means in said open and closed positions;

said control circuit means including a pair of oscillators, one of which has substantially the same frequency as the other to establish said valve means in said open position only when said key is inserted to operate said switch.

2. A brake system according to claim 1 in which said key is an electronic key.

3. A brake system according to claim 2 in which current of one polarity or the other is supplied to said motor by a reversing circuit in response to the frequencies of said oscillators.

4. A brake system according to claim 3 including short circuit protection means for protecting said reversing circuit against shorting.

5. In an automotive vehicle brake system having hydraulic brake means, and valve means operatively connected to control the hydraulic pressure in said brake means, said valve means having an open first position in which it is operable either to relieve said hydraulic pressure or to apply a pressure increase to said brake means, said valve means having at least one additional position in which it acts as a one-way check valve operable to apply a pressure increase to said brake means but not to relieve pressure in said brake means, the improvement which comprises:

an electrically energizable means for controlling the position of said valve means;

and a control circuit means operatively connected to said electrically energizable means which affects the positioning of said valve means in said open position when the vehicle is moving and in said additional position after the vehicle stops;

said control circuit means including;

a selectively operable device;

and a means for energizing said electrically energizable means with current to position said valve means in said additional position when said selectively operable device is not operated and for energizing said electrically energizable means with current to position said valve means in said open position when said selectively operable device is operated; said selectively operable device including a key operated switch and a key insertable to operate said switch; and said control circuit means including a pair of oscillators, one of which has substantially the same frequency as the other to establish said valve means in said open position only when said key is inserted to operate said switch.

* * * * *